United States Patent
Breneman

[15] 3,703,338
[45] Nov. 21, 1972

[54] VEILING REFLECTION AND ILLUMINATION METER

[72] Inventor: Edwin J. Breneman, Wappingers Falls, N.Y.

[73] Assignee: Kollmorgen Corporation, Hartford, Conn.

[22] Filed: May 6, 1971

[21] Appl. No.: 140,884

[52] U.S. Cl............................................356/222
[51] Int. Cl..............................................G01j 1/42
[58] Field of Search...............356/209–212, 222, 356/221, 218, 225, 226, 229, 223, 244, 224

[56] References Cited

UNITED STATES PATENTS

| 3,521,962 | 7/1970 | Tashiro et al..............356/222 |
| R26,632 | 7/1969 | Norwood...................356/222 |
| 3,024,695 | 3/1962 | Nisbet........................356/222 |
| 2,443,058 | 6/1948 | Simmon......................356/223 |
| 3,393,602 | 7/1968 | Stouffer.....................356/209 |
| 3,519,360 | 7/1970 | Kudlek...................356/244 X |
| 1,949,619 | 3/1934 | Pfund.....................356/212 X |
| 1,988,556 | 1/1935 | Hunter.......................356/210 |
| 2,411,486 | 11/1946 | Weisglass.................356/223 |
| 2,462,339 | 2/1949 | Simmon................356/223 X |
| 3,349,665 | 10/1967 | Grosheim et al.......356/209 X |

Primary Examiner—Ronald L. Wibert
Assistant Examiner—Conrad Clark
Attorney—Frederick E. Bartholy

[57] ABSTRACT

The tendency of illumination on a study desk task to produce veiling reflections is measured by a meter connected to two photocells arranged to measure both the total illumination and the portion thereof that will produce veiling reflections.

2 Claims, 6 Drawing Figures

INVENTOR
EDWIN J. BRENEMAN
BY Frederick E. Bartlett
ATTORNEY

INVENTOR
EDWIN J. BRENEMAN

BY *Frederick E Bartke*

ATTORNEY

VEILING REFLECTION AND ILLUMINATION METER

FIELD OF THE INVENTION

This invention relates generally to the measurement of total illumination and the tendency thereof to produce undesirable veiling reflections in a task area.

DESCRIPTION OF THE PRIOR ART

One of the major problems encountered in the illumination of task areas such as desk tops, results from the specular reflections of light sources from the task (e.g., from a paper being read). Frequently the printed or handwritten characters have proportionally higher specular reflectance than the paper on which they appear. Thus, such specular reflections not only contribute to apparent nonuniformity and glare, but they also greatly reduce the effective contrast between the printing or writing and the paper background. Such veiling reflections may exist to an appreciable degree even with matte paper, although a person may be quite unaware that the task contrast has been considerably reduced by poor lighting geometry.

A number of instruments have been designed to evaluate the visibility of a task. For example, as described in the following references:

1. Luckiesh, M. and Moss, F. K., "Visibility — Its Measurement and Significance in Seeing", *Journal of Franklin Institute*, Vol. 220, p. 431, October 1935.
2. Cottrell, C. L., "Measurement of Visibility", *Illuminating Engineering*, Vol. 46, p. 95, February 1951.
3. Blackwell, H. R., "Development and Use of a Quantitative Method for Specification of Interior Illumination Levels on the Basis of Performance Data", *Illuminating Engineering*, Vol. 54, p. 317, June 1959.
4. Blackwell, H. R., Schwab, R. N. and Pritchard, B. S., *Illuminating Engineering*, Vol. 59, p. 277 (1964).
5. Eastman, A., "A New Contrast Threshold Visibility Meter", *Illuminating Engineering*, Vol. 63, p. 111, March 1968.

The instruments described in these references operate on the principle of reducing the measured task to threshold visibility, either by reducing the task luminance or by adding a uniform veiling light. Thus they evaluate not only the amount and geometry of illumination on the task, but also the characteristics of the task itself i.e., physical contrast sharpness, print size, color, etc.). Therefore, except through the use of standard task or target, the meters described do not evaluate illumination systems with respect to a general class of tasks. Moreover, such meters are not as simple in their operation as may be desired in some engineering applications.

A meter described by W. B. Delaney in an article entitled "A Simplified Field Indicator of Veiling Reflections" in *Illuminating Engineering*, Vol. 63, p. 111, March 1968, is intended to measure the degree to which an illumination system produces veiling reflections from a task, as well as measuring the total illumination on the task. It operates on the principle that the light sources which produce such semi-specular reflections are those within a cone which is defined ky the normal viewing angle and the slight spreading of the semi-specular reflections from a typical page. This zone is called the "offending zone". The Delaney instrument is placed on a desk or table in the position normally occupied by the task. It measures successively, the total illumination on the task and the illumination with the offending zone shielded by a black mask. The veiling reflection index is derived from the ratio of these two readings. A polarizing filter may be used in place of the black or opaque shield according to Delaney, presumably to adjust the measurements for the effects of polarized light. However, the effects of polarization are not usually best measured in this manner, and, in addition, the geometry of the instrument does not properly define the offending zone in accordance with the parameters of the task as defined by the Illuminating Engineering Society in the *IES Lighting Handbook*, Fourth Edition, p. 15–16, Illuminating Engineering Society, New York, 1966.

SUMMARY OF THE INVENTION

This invention relates to a compact instrument for measuring that property of illumination which produces veiling reflections in a study-desk task, and for measuring the total illumination on the task. It utilizes two photocells, one of which measures total illumination at the position of the task, and a second which responds only to sources of illumination within the zone in which they produce veiling reflections. Through appropriate electrical circuitry and dial indicators, the responses of the two photocells provide measurements of both the total illumination and the veiling reflection index.

One object of this invention is to provide a new and improved veiling reflection meter.

A particular feature of this invention is that the meter construction in accordance therewith is accurate and compact.

Yet another object of the invention is to provide a convenient and compact instrument for measuring that property of illumination which produces veiling reflections in a task, with the derivation of this measure being determined as far as possible with the task dimensions as specified by the Illuminating Engineering Society.

It is also a further object of the invention to provide for measuring the total illumination on a task as well as the veiling reflection illumination.

It is a particular advantage of the invention that the instrument provides for measuring the ratio of total illumination on a task and such portion which produces veiling reflections.

Other objects, features and advantages will be apparent from the following description of the invention, defined in particularity in the appended claims, and taken in connection with the accompanying drawings, in which:

DESCRIPTION OF THE INVENTION

Figure 1:
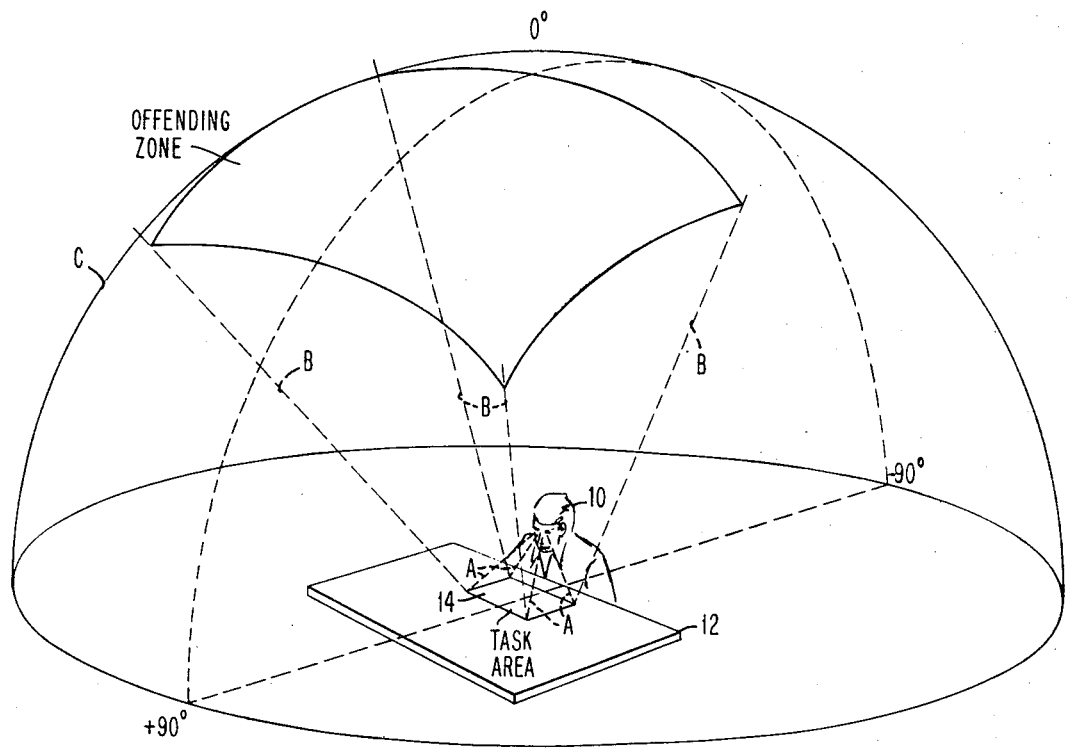
FIG. 1 is a schematic isometric view of a task area showing the relations of the task illumination parameters.

Referring particularly to FIG. 1 of the drawings, the reference numeral 10 designates a worker at a desk 12 on which a task 14, such as a sheet of printed matter which is to be read or studied, may be positioned. The dotted lines A outline the worker's sight zone, while the dotted lines B outline the mirror or reflective zone designated the veiling reflection or offending zone, from which illumination tends to produce veiling reflections interfering with the worker's ability to clearly observe the task. The hemisphere C indicates the solid angle throughout which sources of illumination may illuminate the task area. If the task is a specular reflector with size and geometry as specified by the Illuminating Engineering Society, all sources which illuminate the task from within the solid zone designated by the dotted line B and described "offending zone", will cause specular reflections in the task area. Sources outside this offending zone will cause no veiling reflection.

Figure 3:
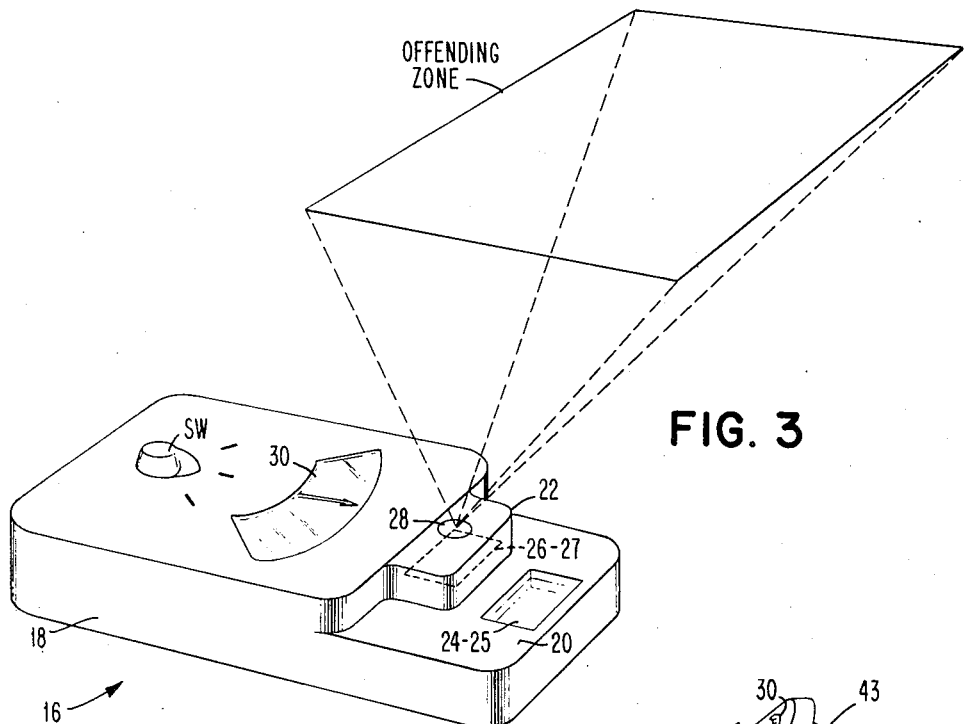
FIG. 3 is a schematic isometric view of a veiling reflection meter, embodying the invention in one form.
Figure 4:
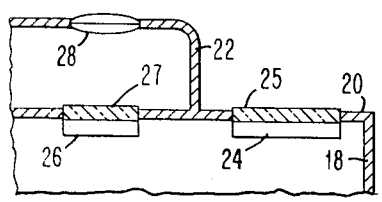
FIG. 4 is an enlarged partial view in section of the meter of FIG. 3.

Referring now to FIG. 3 of the drawings, the numeral 16 denotes generally a veiling reflection meter comprising a case 18 of plastic having a stepped end portion 20 defined by a substantially vertical shoulder portion 22. A photocell 24 is positioned with its diffuser 25, which may comprise a diffusing plastic or opal glass cover as shown in FIGS. 3 and 4, on the stepped portion 20. In this position it is partially shielded by the shoulder 22. This corresponds to the shielding effect on the task area of the worker's body and thus gives a response to the normal total illumination on the task.

A second photocell 26 with a similar diffuser 27 is located within the case 18, and is provided with an optical system represented by the lens 28. The location and size of the photocell 26 in the image plane of the lens 28 is such that it establishes the field of view in accordance with the offending zone as described in connection with FIG. 1 (the zone within which sources produce veiling reflections on the task as defined by the IES specifications on the study desk task).

Figure 5:
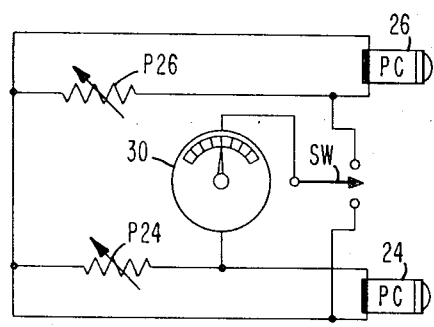
FIG. 5 is a schematic circuit diagram showing one arrangement of the electric circuit used in the invention.

The veiling reflection index is obtained from the ratio of the responses from the two photocells 24 and 26. As shown in FIG. 5, direct readout of this index can be provided by circuit means such as a bridge circuit connection of a meter 30 with the photocells 24 and 26. Potentiometers P24 and P26 are connected with each of the photocells for adjusting the relative response effects of the photocells if desired. Switch SW selectively connects the meter 30 to measure the index (ratio), the total illumination, or disconnects the meter.

Should it be desired to either weigh the importance of some areas of the offending zone more heavily than others, or to limit the offending zone gradually by a decreasing penumbra of sensitivity to account for the semi-specularity of veiling reflections, these effects can be obtained by displacing the veiling reflection photocell 26 slightly from the image plane of the lens 28 and/or by the use of appropriate graded density filters over the photocell diffuser.

With sufficient photocell sensitivity, one or more very thin glass reflector plates could be substituted in place of the photocell and diffuser 26–27 of the veiling reflection lens 28. The photocell and diffuser 26–27 could then be moved to a position where it would measure the light reflected from such plates. This would make the instrument polarization sensitive in such a way that it would more properly evaluate the extent to which polarizing light sources produce veiling reflections in such task.

As an alternative, a single photocell could be used with a turret to permit successive placement over the photocell of a diffuser for measuring illumination generally, and a diffuser plus optical field limiter for measuring sources within the offending zone. In this case a control such as a potentiometer would be provided to permit adjustment of the general illumination indication to be prescribed index. Subsequent measurement of sources within the offending zone would then directly indicate the proportional response and hence the veiling reflection index of the two quantities.

Figure 6:
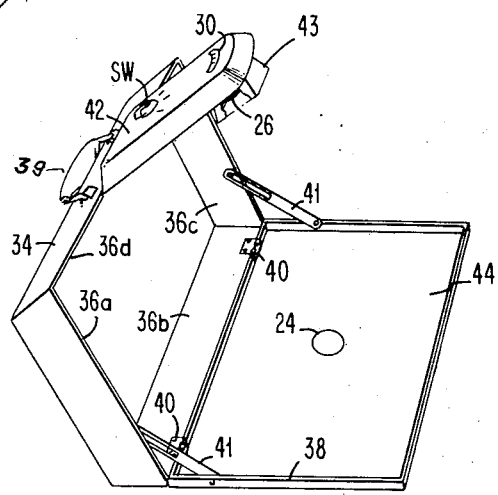
FIG. 6 is a schematic isometric view of another embodiment of the invention.

Referring now to FIG. 6 of the drawings, the reference numeral 32 denotes generally a portable veiling reflection and illumination meter embodying the invention in a different form. As shown, the meter 32 comprises a case 34 having upstanding sides 36a–d, with a lid 38 attached by hinges 40 to the upper edge of side 36b. Pivoted and slotted guides 41 limit the movement and determine the relative position of lid 38 and case 34, permitting it to be opened to the position shown and maintain a predetermined relation with the case 34. A folding meter and photocell housing 42 is hinged to the upper edge of side 36d so as to be foldable into the case for storing and opened to the position shown for operation. Handle 39 provides for carrying the closed case 34. The housing 42 accommodates a meter 30 and a veiling reflection photocell 26, with the photocell 26 disposed on the underside of the housing 42 with a shield 43 which conforms to the angle formed with the lid 38 for measuring the offending illumination. This cell should be approximately 14 inches directly above the center of the task edge which is nearest to the edge of the desk adjacent the worker. The housing 42 also contains the necessary electric circuits for not only the photocell 26 in the shield, but also for a photocell 24 positioned at the center of a glass reflector plate 44 positioned in the lid 38 for measuring the total illumination on the task.

The photocell 26 in the housing 42 is directed toward the center of the plate 44 and has a field of view limited to substantially this area so as to measure light reflected therefrom, namely, the offending zone. Non-reflecting material, such as black cloth or matte paper, may be placed on the desk around the meter case 34 to limit the effects of extraneous reflection. They may be made attachable to the edges of the lid 38 if desired, so as to be readily available.

The second photocell 24 provides not only a measure of the total illumination at the center of the task, but, in combination with the indication of the meter 26, gives the proportion of illumination which produces veiling reflections.

To measure the veiling reflection index, the photocells 24 and 26 may be connected in a circuit as shown in FIG. 5.

The meter 30 is connected between adjustable potentiometers P24 and P26 and their associated photocells 24 and 26, respectively. For a measurement of the total illumination alone, the meter 30 can be connected to be affected by the response of the photocell 24 alone, such as by means of selector switch SW.

A glass reflecting plate 44 is used rather than a metal coated mirror so that the reflected light will be polarized to more or less the same extent as reflections from a task. The bottom of the plate 44 can be painted black to prevent contamination of the specular surface reflections by unwanted diffused reflections. Since the reflection from a single glass-air surface is rather weak (i.e., about 4 percent), several glass plates may be used, one atop the other, to increase reflection efficiency by introducing more surfaces. The number of usable surfaces is $2n-1$, $n$ being the number of glass plates and $-1$ representing the loss of reflection at the lower surface of the bottom plate which is painted black. The use of a number of surfaces may be introduce a slight discrepancy between the degree of polarization obtained with the plates and that which is obtained with a typical task (i.e., glossy paper), but the marked gain in reflection efficiency thus obtained may be of greater importance if the photocells are not highly sensitive.

When the instrument 32 is opened and placed in operating position, the case 34 and housing 42 provide an obstacle which closely resembles the size and position of the body and head of a worker 10 performing the corresponding tasks. Thus the measurements of total illumination and veiling reflection index will accurately represent the values which would be obtained in practice.

The above-described instrument could utilize a metal-coated glass mirror if so desired, and by providing a plurality of slot-like stops in the guides 41, different angular positions and hence different task conditions could be simulated; for example, reading in a chair or bed, instead of at a desk. In addition, several photocells such as the cell 24 could be used, being located for example at the corners of the lid 38 to obtain a more representative average illumination response. Likewise, if desired to weigh the importance of some areas of the task area more than others, or to limit the offending zone by a decreasing penumbra of sensitivity in order to account for the semi-specularity of veiling reflections, these effects can be obtained by using a veiling reflection photocell 26 of a large size and/or suitably controlling its goniophotometric sensitivity by optical means.

Figure 2:
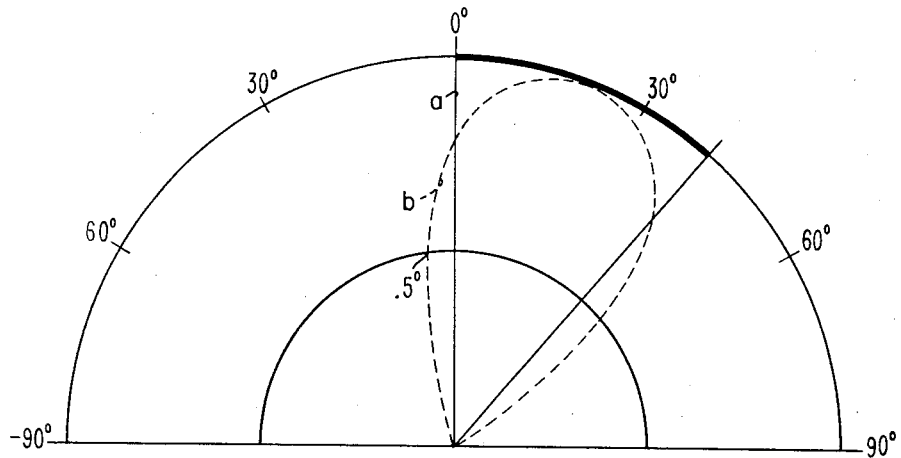
FIG. 2 is a chart showing a polar coordinate plot of the meter sensitivity.

The instrument described measures veiling reflections with a goniophotometric sensitivity function as depicted by the polar curve a of FIG. 2. This curve indicates a uniform sensitivity to sources within a sharply defined offending zone. This sensitivity function is appropriate only if the task to be evaluated is highly specular and if all areas of the task are equally important. Most reading tasks involve materials which are partially diffusing. This type of task would be more accurately evaluated if the instrument had a sensitivity pattern of the type indicated by the curve b in FIG. 2. This type of sensitivity may be produced by any of the following modifications, or by a combination of them: a) by increasing the diameter of the veiling reflection photocell or its collecting optics; b) by placing a lens in front of the veiling reflection photocell in such a way that an image of the reflecting plates 44 is formed on the surface of the photocell, and by placing a nonuniform density filter over the photocell so that its relative sensitivity to different parts of the task area is controlled in the desired way; or c) by using a partially diffusing surface on one or more surfaces of the glass reflecting plates 44.

From the above description and the accompanying drawings, it will be apparent that the invention hereinbefore described measures the illumination within the offending zone in accordance with the IES definition of the task. Consequently, it accurately delineates the offending zone within which sources produce specular veiling reflections. In addition, reflections from the glass reflector plates are polarized to approximately the same extent as reflections from corresponding parts of a real task so that the instrument properly evaluates both polarized and unpolarized sources. The instrument moreover measures both total illumination and veiling reflection index without the need for accessory apparatus or operation. The body of the instrument provides a shielding effect which simulates a worker's body, and it serves as a guide to position tasks simulating reflector plates at the specified distance from the edge of the desk.

The invention in its broader aspects is not limited to the specific embodiments herein shown and described but changes may be made within the scope of the accompanying claims without departing from the principles of the invention and without sacrificing its chief advantages.

What is claimed is:

1. Apparatus for indicating the veiling reflection over an illuminated work surface comprising a casing adapted to be placed over said surface, an indicating meter in said casing, a pair of photocells positioned in said casing, circuit means for alternately connecting said photocells to said meter, one of said photocells being positioned to receive light reflected from said surface and the other photocell being positioned to receive light incident upon said surface, the ratio between alternate indications of said meter determining the veiling reflection of said work surface.

2. Apparatus in accordance with claim 1 wherein said casing is of stepped formation construction, the photocell directed toward the incident light being located in the higher step and the photocell directed on the work surface being located in the lower stp, said construction thereby effecting light isolation of said cells.

* * * * *